United States Patent [19]

Reilly

[11] Patent Number: 5,110,499
[45] Date of Patent: May 5, 1992

[54] METHOD FOR INCREASING THE BRIGHTNESS AND HALFLIFE OF ELECTROLUMINESCENT PHOSPHORS

[75] Inventor: Kenneth T. Reilly, Towanda, Pa.

[73] Assignee: GTE Products Corporation, Stamford, Conn.

[21] Appl. No.: 678,515

[22] Filed: Apr. 1, 1991

[51] Int. Cl.⁵ .............................................. C09K 11/56
[52] U.S. Cl. .............................................. 252/301.6 S
[58] Field of Search ................................. 252/301.6 S

[56] References Cited

U.S. PATENT DOCUMENTS

| | | | |
|---|---|---|---|
| 2,874,128 | 2/1959 | Wachtel | 252/301.6 S |
| 2,957,830 | 10/1960 | Goldberg et al. | 252/301.6 S |
| 3,000,834 | 9/1961 | Aven | 252/301.6 S |
| 3,076,767 | 2/1963 | Faria et al. | 252/301.6 S |
| 3,082,175 | 3/1963 | Thornton | 252/301.6 S |
| 4,859,361 | 8/1989 | Reilly et al. | 252/301.6 S |
| 5,009,808 | 4/1991 | Reilly et al. | 252/301.6 S |

*Primary Examiner*—Jack Cooper
*Attorney, Agent, or Firm*—Elizabeth A. Levy

[57] ABSTRACT

A method for increasing the brightness and halflife of an electroluminescent phosphor by increasing the average particle size of the phosphor to greater than 25 micrometers in diameter.

4 Claims, No Drawings

METHOD FOR INCREASING THE BRIGHTNESS AND HALFLIFE OF ELECTROLUMINESCENT PHOSPHORS

This invention relates to electroluminescent phosphors and a method for improving the brightness and halflife thereof. Significant improvements are obtained by increasing the average particle size of such phosphors to greater than 25 micrometers in diameter.

BACKGROUND OF THE INVENTION

U.S. Pat. No. 4,859,361 to Reilly et al., the teachings of which are hereby incorporated by reference, describes a method of making electroluminescent phosphors which have a particle size ranging from 15 to 60 micrometers.

The performance of such phosphors is heavily dependent on the particle size of the phosphor. Generally, the brightness and halflife of the phosphor are greater if the particles are coarse, i.e., are larger than about 25 micrometers in diameter. Thus, fine phosphor particles (i.e., those having an average particle size of less than 25 micrometers in diameter) are undesirable because of inferior brightness and halflife characteristics.

It is common practice to screen the phosphor to ensure that only particle sizes of 25 micrometers or greater are provided. Typically about fifty to seventy percent of the phosphor production lot exceeds this particle size and can be used in electroluminescent display devices, while the remaining thirty to fifty percent of the lot is considered too fine to be useful. Thus, a significant portion of the phosphor yield is unsatisfactory for use in electroluminescent display devices.

SUMMARY OF THE INVENTION

It is an object of the invention to provide a method for improving the brightness and halflife of small particle size electroluminescent phosphors.

It is another object of the invention to provide a method of increasing the useful production yield of electroluminescent phosphors so that substantially the entire production lot has an average particle size of greater than 25 micrometers.

In accordance with the invention, there is provided a method for increasing the average particle size and thereby improving the brightness and halflife of an electroluminescent phosphor having a metal activator, comprising the steps of: blending particles of the phosphor having an average particle size of less than 25 micrometers in diameter with a chloride flux to form a uniform mixture; heating the mixture at a temperature of from about 1000° C. to about 1300° C. for about 2 to about 4 hours to convert at least a portion of the mixture to a crystalline material; washing the mixture with sufficient water to remove at least a major portion of the water-soluble material from said crystalline material; drying the washed material to produce a relatively moisture-free material; subjecting the relatively moisture-free material to low-intensity milling for a sufficient time to change the crystallographic structure of at least a portion of the moisture-free material from a hexagonal structure to a cubic structure; and further activating the material by blending it with additional metal activator and heating the resulting mixture at a temperature of from about 650° C. to about 750° C. for about 1.5 to about 3 hours to form an electroluminescent phosphor having an increased average particle size and improved brightness and halflife.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

"Halflife" is defined as the time required for the brightness of an electroluminescent display device to diminish to half its initial value. The initial brightness of the device is typically measured at 100 volts, 400 Hertz after a 24-hour burn-in period at these conditions.

Electroluminescent phosphors which are especially suited for this invention include copper-activated zinc sulfide phosphors, which are blue-green in color, and copper- and manganese-activated zinc sulfide phosphors, which are yellow-orange in color.

The phosphor is initially produced according to the method described in U.S. Pat. No. 4,859,361 to Reilly et al., previously incorporated by reference. This method results in an electroluminescent phosphor having a particle size ranging from 15 to 60 micrometers in diameter. The phosphor is screened to separate the fraction exceeding 25 micrometers in diameter from the fraction having a smaller particle size. In the case of a copper-activated zinc sulfide phosphor, the fraction exceeding 25 micrometers in diameter is about 60% of the production lot. The remaining 40% of the lot has an average particle size of less than 25 micrometers in diameter.

The fraction which has a particle size of less than 25 micrometers in diameter is then processed by the method of this invention. The fine phosphor particles are blended with a chloride flux which can be alkali metal chlorides, alkaline earth metal chlorides, and mixtures thereof, to form a uniform mixture.

The mixture is then fired at a temperature of about 1000° C. to about 1300° C. for about 2 to 4 hours to convert at least a portion of the mixture to a crystalline material. The preferred firing conditions are 3 hours at 1200° C.

The fired material is then washed with sufficient water to remove at least a major portion of the water-soluble material from the crystalline material. Generally when the wash water has a conductivity of less than about 30 micromhos it indicates that essentially all of the water-soluble material has been removed. Deionized water is the preferred wash water.

The washed material is then dried to produce a relatively moisture-free material.

The dried material is then subjected to low-intensity milling for a sufficient time to change the crystallographic structure of at least a portion of this material from a hexagonal structure to a cubic structure.

The milled material is then further activated with additional metal activator in order to adjust the emission color of the resulting electroluminescent phosphor. The milled material is blended with additional metal activator to form a second mixture. If the phosphor is to be a copper-activated electroluminescent phosphor, the added metal activator is copper in the form of copper sulfate, and zinc sulfate. If the phosphor is to be a copper- and manganese-activated electroluminescent phosphor, the added metal activators are copper and manganese in the form of copper sulfate and manganese carbonate, respectively, as well as zinc sulfate.

The second mixture is then fired at a temperature of about 650° C. to about 750° C. for about 1.5 to 3 hours to form an activated material. The preferred firing conditions are 2 hours and 15 minutes at 700° C.

The fired material is then cooled in air at room temperature for at least 20 minutes, after which it may be optionally quenched in water. The quenching water is then removed from the quenched material.

The cooled material is then washed with reactive aqueous solutions to remove residual fluxes and excess activator materials. Preferred aqueous solutions include acetic acid, hydrochloric acid, and potassium cyanide aqueous solutions. Acetic acid is used to remove unreacted zinc materials from the activated material. Hydrochloric acid is used to remove unreacted manganese materials from the activated material. Potassium cyanide solution is used to remove excess copper materials from the activated material.

The washed material is then dried to form an electroluminescent phosphor.

The following nonlimiting examples are presented.

EXAMPLE I

Particles of a copper-activated zinc sulfide electroluminescent phosphor having an average diameter of 23 micrometers are blended with a chloride flux in an amount equal to about 8% by weight of the phosphor. The flux consists of 3% barium chloride, 3% magnesium chloride, and 2% sodium chloride, based on the weight of the phosphor. The mixture is then fired in a covered crucible in air to a temperature of about 1200° C. for about 3 hours to produce a well-crystallized material. The crystallized material is then washed in water until excess halides are removed, as determined by a measurement of the conductivity of the spent wash water. A conductivity of less than about 30 micromhos indicates that the excess halides are removed. The phosphor is then dried at a temperature of about 110° C. The dried material is then milled at a low intensity for about 1.5 hours which is sufficient to change the crystallographic structure of at least some of the dried material.

The material is then blended with about 1 weight percent copper as copper sulfate and 5.8 weight percent zinc as zinc sulfate and fired at 700° C. for about 2 hours and 15 minutes. After firing, the phosphor is cooled in air at room temperature for at least 20 minutes. The cooled phosphor is washed with aqueous acetic acid (0.2 liters acetic acid in 1 liter water) and potassium cyanide solution (1 pound potassium cyanide in 2.5 gallons water). The phosphor is then dried at a temperature of 110° C.

EXAMPLE II

Particles of manganese- and copper-activated zinc sulfide electroluminescent phosphor having an average diameter of 23 micrometers are blended with a chloride flux in an amount equal to about 8% by weight of the phosphor. The flux consists of 3% barium chloride, 3% magnesium chloride, and 2% sodium chloride, based on the weight of the phosphor. The mixture is then fired in a covered crucible in air to a temperature of about 1200° C. for about 3 hours to produce a well-crystallized material. The crystallized material is then washed in water until excess halides are removed, as determined by a measurement of the conductivity of the spent wash water. A conductivity of less than about 30 micromhos indicates that the excess halides are removed. The phosphor is then dried at a temperature of about 110° C. The dried material is then milled at a low intensity for about 1.5 hours which is sufficient to change the crystallographic structure of at least some of the dried material.

The material is then blended with about 4 weight percent manganese as manganese carbonate, 1 weight percent copper as copper sulfate and 5.8 weight percent zinc as zinc sulfate and fired at 700° C. for about 2 hours and 15 minutes. After firing, the phosphor is cooled in air at room temperature for at least 20 minutes. The cooled phosphor is washed with aqueous acetic acid (0.2 liters acetic acid in 1 liter water), aqueous hydrochloric acid (0.3 liters hydrochloric acid in 1 liter water) and potassium cyanide solution (1 pound potassium cyanide in 2.5 gallons water). The phosphor is then dried at a temperature of 110° C.

Table I indicates the improvement in brightness and halflife of a copper-activated zinc sulfide electroluminescent phosphor made by the process of this invention. The phosphor was incorporated into an electroluminescent display device which was operated at 100 volts, 400 Hertz.

TABLE 1

BRIGHTNESS, HALFLIFE AND PARTICLE SIZE OF REPROCESSED SMALL SIZED ELECTROLUMINESCENT PHOSPHOR

| | BRIGHTNESS (ft-lamberts) | HALFLIFE (hrs) | AVG PARTICLE SIZE (micrometers) |
|---|---|---|---|
| CONTROL (Particle size = 15–60 um) | 25.5 | 310 | 29.0 |
| I (fraction of CONTROL exceeding 25 um) | 27.3 | 407 | 35.0 |
| II (fraction of CONTROL less than 25 um) | 19.5 | 210 | 23.0 |
| III (II reprocessed) | 29.0 | 453 | 31.2 |

It is apparent from the Table that reprocessed phosphors (Sample III) exhibit a 216% increase in halflife and a 49% increase in brightness over unprocessed phosphors having a particle size of less than 25 micrometers (Sample II). The particle size of the reprocessed phosphor is increased by 36% over that of the unprocessed phosphor. Furthermore, the reprocessed phosphor is brighter than both the unscreened control lot (CONTROL) and the fraction exceeding 25 micrometers (Sample I) by 14% and 6%, respectively. The halflife of the reprocessed phosphor exceeds that of the unscreened control lot and the fraction exceeding 25 micrometers by 46% and 11%, respectively.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for increasing the average particle size and improving the brightness and halflife of an electroluminescent copper-activated zinc sulfide or copper- and manganese-activated zinc sulfide phosphor, comprising the steps of:
   a) blending particles of said phosphor having an average particle size of less than 25 micrometers in diameter with a chloride flux to form a uniform mixture;
   b) heating said mixture at a temperature of from about 1000° C. to about 1300° C. for about 2 to about 4 hours to effect production of a crystalline material;
   c) washing said crystalline material with sufficient water to remove at least a major portion of the water-soluble material therefrom;
   d) drying the washed material to produce a relatively moisture-free material;
   e) subjecting said relatively moisture-free material to low-intensity milling for a sufficient time to change the crystallographic structure of at least a portion of the moisture-free material from a hexagonal structure to a cubic structure; and
   f) adding to the milled material copper sulfate and zinc sulfate where the phosphor is copper-activated zinc sulfide and additionally manganese carbonate where the phosphor is copper- and manganese-activated zinc sulfide to form a mixture and heating the resulting mixture at a temperature of from about 650° C. to about 750° C. for about 1.5 to about 3 hours to form said electroluminescent phosphor having an increased average particle size of greater than 25 microns and improved brightness and halflife.

2. The method of claim 1 wherein said electroluminescent phosphor is copper-activated zinc sulfide.

3. The method of claim 1 wherein said electroluminescent phosphor is a copper- and manganese-activated zinc sulfide.

4. The method of claim 1 wherein the resulting electroluminescent phosphor from step (f) is further cooled, washed to remove residual fluxes and activator materials, and dried.

* * * * *